Figure 1:
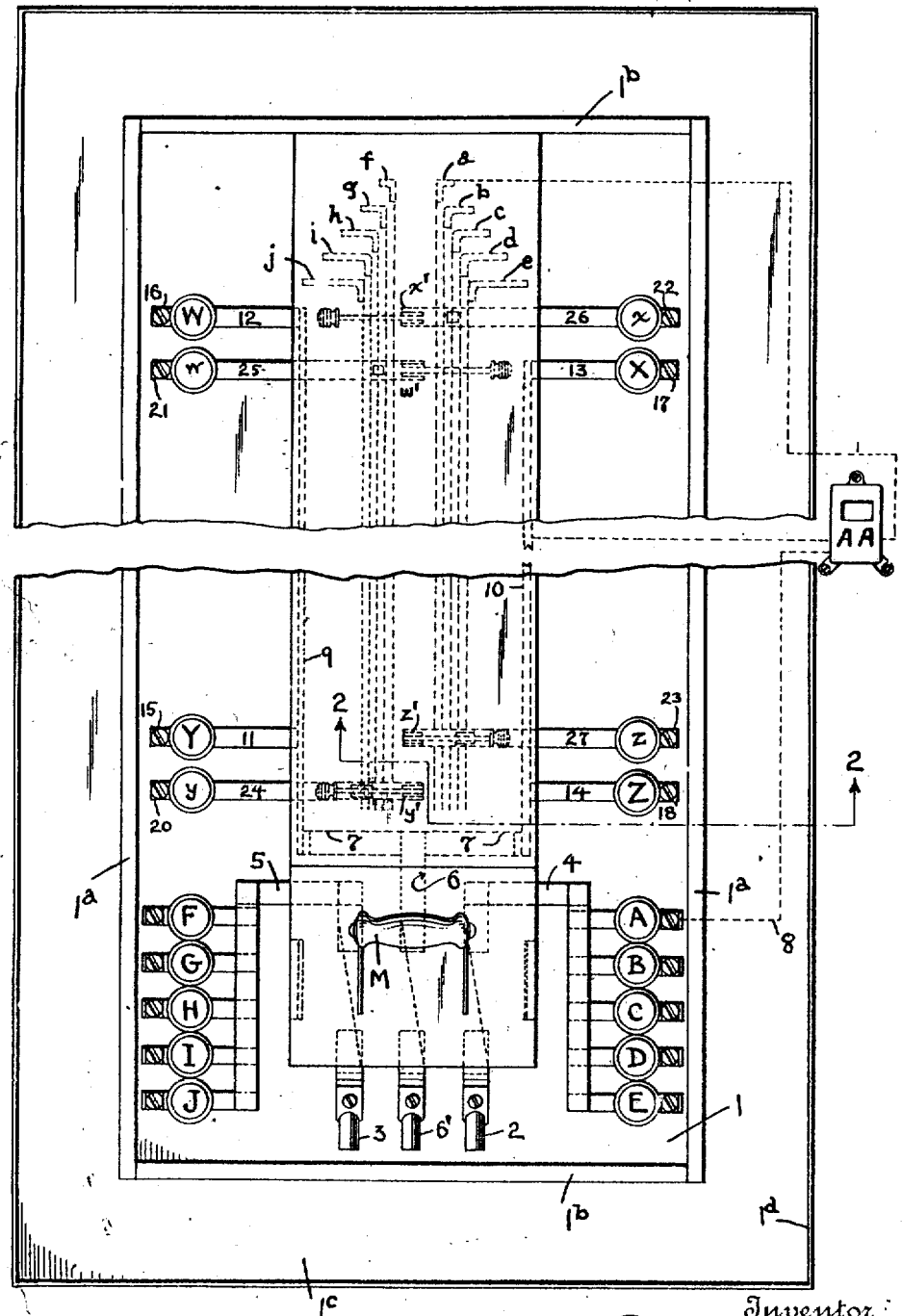

H. F. KRANTZ.
SHIFT SOCKET METER PANEL.
APPLICATION FILED FEB. 18, 1916
1,306,341.
Patented June 10, 1919.
2 SHEETS—SHEET 2.
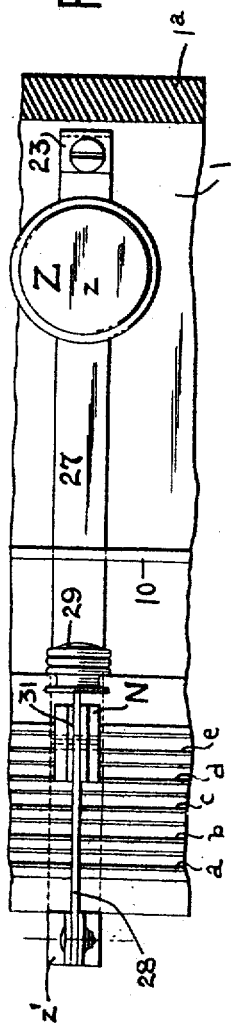
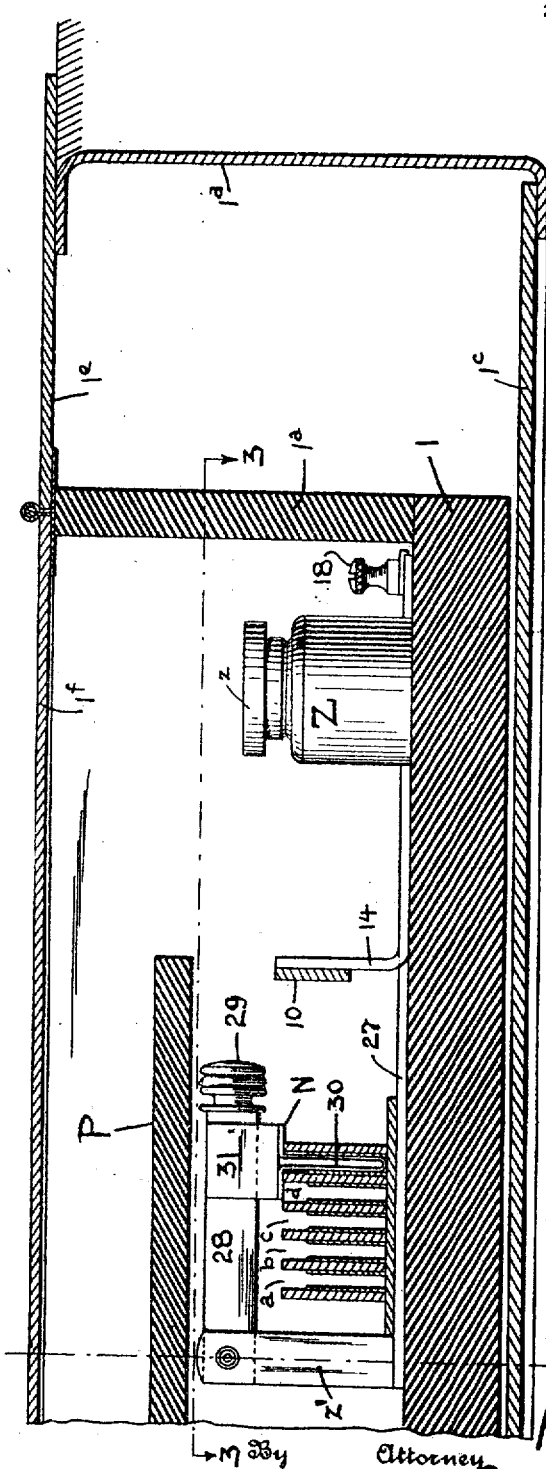
Inventor
Hubert F. Krantz
By
Albert F. Nathan
Attorney

UNITED STATES PATENT OFFICE.

HUBERT F. KRANTZ, OF BROOKLYN, NEW YORK, ASSIGNOR TO KRANTZ MANUFACTURING COMPANY, INC., OF BROOKLYN, NEW YORK, A CORPORATION OF NEW YORK.

SHIFT-SOCKET METER-PANEL.

1,306,341.  Specification of Letters Patent.  Patented June 10, 1919.

Application filed February 18, 1916. Serial No. 79,096.

*To all whom it may concern:*

Be it known that I, HUBERT F. KRANTZ, a citizen of the United States, and residing at Brooklyn, in the county of Kings and State of New York, have invented a new and Improved Shift-Socket Meter-Panel, of which the following specification is a full disclosure.

This invention deals with a so-called metering panel and it aims to provide a simple and compact structure whereby the multiplicity of connections may readily be taken care of with a minimum amount of trouble.

Another object within the contemplation of this invention is to provide a metering panel such that each meter will have a bus bar mounted on the board and so that each branch line circuit will be represented by a terminal element, together with a very simple arrangement for connecting each terminal member with any given one of the metering bars so that each individual user may have his consumption of current recorded by a single meter irrespective of the number of branch line circuits he is utilizing.

A further object of this invention is to create a contact system such that a given circuit may ve y readily be connected to one or another of a plurality of other conductors and to do so by a very simple arrangement.

More specifically, an object of this invention is to devise an arrangement whereby a terminal member branch adjacent a plurality of conductors can be readily connected with any one of the same by means of an ordinary swinging knife switch by providing a clip or socket adapted as an interponent in establishing connection between the knife or other switch blade and the selected conductor.

Another object is to formulate a construction such that the dimensions of the panel may be very materially reduced without diminishing its capacity, and by so arranging the meter bars in relation to the other elements that not only will a compact formation be provided but one capable of being easily understood and made use of in practice by inspectors or such persons as will have occasion to adjust these devices.

Another object is to develop a metering panel in which the various meter bars can be arranged in parallelism edgewise to the plane of the base board thereby exposing the various meter bars to view and enabling the user visually to determine the correctness of his adjustment.

Other objects will be in part obvious from the annexed drawings and in part indicated in connection therewith by the following analysis of this invention.

This invention accordingly consists in the features of construction, combinations of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a plan of a meter panel embodying this invention and showing not only a convenient instrumentality for establishing connection between various branch line circuits and the selected meter bars, but also showing a compact and convenient meter bar arrangement. Fig. 2 is a section along line 2—2 of Fig. 1 showing in enlarged detail one embodiment of the proposed connection device. Fig. 3 is an enlarged plan of the parts as shown by Fig. 2 with the overlying insulating board removed.

Referring to the drawings, this invention is shown adapted for the three-wire system, although it will, of course, be perceived, that it is equally suitable for a two-wire arrangement. The various parts are positioned upon a suitable base plate 1 of insulating material which in turn provides side walls 1$^a$ and end walls 1$^b$ forming a box for enabling the parts to be better protected against accidental handling. This box of insulating-material may in turn be contained within a sheet iron junction box formed of the bottom plate 1$^c$; the side walls 1$^d$ and the top 1$^e$ having the hinged door 1$^f$.

Terminal pieces for receiving the main line leads are indicated by 2, 3 and 6$^1$, the latter being the neutral member and the other two being positive and negative, respectively. These lead through a suitable main line switch M to the bars 4, 5 and 6, respectively, which in turn are connected with the fuse plugs A, B, C, D, E, F, G, H, I and J, each of which is in circuit with its respective meter. One such meter A A is shown with its appropriate wiring and will serve to illustrate the mode of connection with the remainder of the meters. Thus, a lead 8 extends from the terminal of the plug A to the appropriate terminal of the meter. The bar 6 is, by means of the cross conductors 7, connected with the two main line neutral bus bars 9 and 10 which are spaced apart so as to form a gutter or race-way within which are arranged the conductors from the various meters, and which will here be termed meter bars. These conductors are shown in the form of elongated flat strips arranged edgewise to the plane of the board and these neutral main line bus bars 9 and 10 are provided with extensions 11, 12, 13, 14, etc., leading to the fuse plugs X, Y, Z and W connected with the terminals 15, 16, 17 and 18 of the various branch line circuits which are to be connected in various ways with any one or more of the meters. The incoming ends of these various branch line circuits are connected to terminals 20, 21, 22, 23, etc., in communication with the safety fuse plugs $x$, $y$, $z$ and $w$, and the latter are in turn connected by strips 24, 25, 26 and 27 with the knife switch pillars $x^1$, $y^1$, $z^1$ and $w^1$ all of which are preferably arranged along the center line of the gutter formed by the bus bars 9 and 10. Arranged within the gutter, preferably in two series, are a plurality of meter bars $a$, $b$, $c$, $d$ and $e$ on the one side of the post $x^1$, $y^1$, $z^1$ and $w^1$ and a similar series $f$, $g$, $h$, $i$ and $j$ are also arranged on the opposite side of said posts. These meter bars are preferably in the form of flat elongated strips and are shown arranged edgewise and they are separated by means of strips of insulating material, and conveniently each of these meter bars may be constituted of two thin strips spaced apart as shown by Fig. 2 against the walls of the separators thereby constituting receptacles or sockets for the reception of contact terminals as will presently be explained.

Referring now more particularly to Figs. 1 and 2, the post $z^1$ is pivoted to the upper end thereof of a conductor 28 formed in the manner of a suitable switch as of the knife blade type and provided with a handle 29 for its actuation. This knife switch is used for establishing connection between a given meter bar and the branch line circuit which it represents and this may very effectively be accomplished by means of the terminal or contact element N which has a tongue 30 of a laterally expansile type (as by having spring sides and bent up of a single U-shaped strip) and connected with this tongue is a socket portion 31 adapted to receive the knife blade 28. The slot in the portion 31 (which constitutes a spring clip) extends transversely to the tongue 30.

The operation of this device is as simple as its structure. The element N is merely lifted out of its socket formed by the meter bar and is then slipped into that provided by the selected meter bar and then the switch blade is merely swung down into place to enter the spring clip 31 and establish contact. By reason of the peculiar arc-like swing of the switch blade 28, it may be readily swung out of contact with the clip 31 without pulling the element N away from its meter bar. A plate of insulating material P may, if desired, be used to cover these blades and the underlying meter bars, and, if desired, this plate may provide apertures for enabling access to be had to the blades and the pieces N, and at the same time prevent the fingers coming into contact with any live parts.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure the following combinations of elements, or equivalents thereof, by Letters Patent of the United States:—

1. A contact system combining a series of stationary conductors spaced apart in insulated relation, a shiftable conductor which is shiftable in a fixed path relatively to all of said stationary conductors but which is at all times spaced from said stationary conductors, and a separately formed independently movable contact member having a part to engage any selected one of said stationary conductors and also having a part adapted to be engaged by the shiftable conductor by the operation of shifting said shiftable conductor whereby said separately formed contact member may be placed to electrically connect the shiftable conductor with any selected stationary conductor upon shifting of the shiftable conductor.

2. A contact system combining a group of stationary conductor bars spaced apart in insulated relation, a shiftable elongated conductor mounted at one side of said group shiftable into and out of position extending transversely across the group but which is at all times spaced from all of the conductor bars, and a separately formed independently movable contact member having a part to engage any selected one of said stationary conductor bars and also having a part to engage the shiftable conductor at any point in the length thereof whereby said separately formed contact member may be placed to electrically connect the shiftable conductor with any selected stationary conductor upon shifting of the shiftable conductor.

3. A meter panel comprising a base board, a group of stationary meter bars arranged edgewise at one face of said base board, said meter bars being spaced apart in substantially parallel insulated relation, a branch line conductor extending along the mentioned face of said base board transversely of said group of meter bars between said group of meter bars and the base board, being insulated from said meter bars, a movable conductor member pivotally connected to said branch line conductor bar at one side of said group of meter bars adapted to swing in a given path transversely of the outer edges of said group of meter bars, but which is at all times spaced from all of the meter bars, and a separately formed independently movable contact member having a part to engage any selected one of said meter bars and also having a part to be engaged by the movable conductor during the movement thereof whereby said separately formed contact member may be placed to electrically connect the movable conductor with any selected meter bar upon movement of the movable conductor.

4. A meter panel comprising a base board, two groups of stationary meter bars all arranged at one face of said base board, said groups being spaced away from each other to provide a channel between them, the meter bars of the respective groups being spaced apart in substantially parallel insulated relation, a plurality of standards projecting from the face of the base board spaced apart along the length of said channel, a plurality of independently manually operable conductor members pivotally mounted upon said standards to swing into and out of position over the outer edges of said meter bars, and means whereby each of said movable conductor members may be caused to make electrical connection with any selected one of said meter bars at will.

5. A contact system combining a plurality of stationary substantially parallel conductor bars, a switch blade pivoted to swing toward and away from all of the conductor bars about an axis extending substantially parallel with said conductor bars, and an independent movable contact element adapted to be positioned in the path of said switch blade in contact with any selected one of the conductor bars, whereby said blade may be enabled to selectively establish electrical connection with any given conductor bar.

6. A contact system comprising a pivotally mounted knife-type switch blade, a contact member comprising opposite spring jaws for engagement by the switch blade in the usual manner, a plurality of conductor members spaced apart in insulated relation adjacent the switch blade, and said contact member being separately formed and manually movable from one of said conductor members to another at will and including a part whereby to detachably retain it connected with any selected one of said conductor members with its spring jaws in position to receive the switch blade.

7. In a meter panel, the combination comprising a base board, a group of meter contacts arranged at one face of said base board, a movably mounted conductor member movable into and out of a position adjacent to but not engaging the meter contacts, and a part which is movable relatively both to said meter contacts and to said conductor member, said part being adjustable for engaging any selected meter contact and being adapted, when the conductor member is moved into position adjacent the meter contacts, to engage said conductor member and thereby to bridge the space between said selected meter contact and said conductor member.

In witness whereof, I hereunto subscribe my name, as attested by the two subscribing witnesses.

HUBERT F. KRANTZ.

Witnesses:
 LEON MINTZ,
 B. COOKE.